United States Patent
Caponetti et al.

(10) Patent No.: US 10,619,623 B2
(45) Date of Patent: Apr. 14, 2020

(54) SELECTIVE WIND TURBINE DAMPING USING ACTIVE DAMPING SYSTEM

(71) Applicant: VESTAS WIND SYSTEMS A/S, Aarhus N (DK)

(72) Inventors: Fabio Caponetti, Aarhus C (DK); Thomas Krüger, Tilst (DK); Ian Couchman, Horley (GB); Ilias Konstantinos Ariston, Aarhus C (DK); Martin BrØdsgaard, Aarhus (DK); Jacob Deleuran Grunnet, Aarhus C (DK); Jesper Sandberg Thomsen, Hadsten (DK); Peter Mortensen Sigfred, Risskov (DK)

(73) Assignee: VERSTAS WIND SYSTEMS A/S, Aarhus N (DK)

( * ) Notice: Subject to any disclaimer, the term of this patent is extended or adjusted under 35 U.S.C. 154(b) by 933 days.

(21) Appl. No.: 15/102,955

(22) PCT Filed: Dec. 5, 2014

(86) PCT No.: PCT/DK2014/050416
§ 371 (c)(1),
(2) Date: Jun. 9, 2016

(87) PCT Pub. No.: WO2015/086024
PCT Pub. Date: Jun. 18, 2015

(65) Prior Publication Data
US 2016/0377058 A1    Dec. 29, 2016

(30) Foreign Application Priority Data

Dec. 9, 2013  (DK) .................................. 2013 70751

(51) Int. Cl.
*F03D 7/04* (2006.01)
*F03D 7/02* (2006.01)
*F03D 9/25* (2016.01)

(52) U.S. Cl.
CPC ........... *F03D 7/0296* (2013.01); *F03D 7/024* (2013.01); *F03D 7/0224* (2013.01);
(Continued)

(58) Field of Classification Search
CPC .......................... F03D 7/0224; F03D 7/0296
See application file for complete search history.

(56) References Cited

U.S. PATENT DOCUMENTS 7,952,217 B2 * 5/2011 Nielsen ................. F03D 7/0224
    290/44
8,249,852 B2 * 8/2012 Thulke .................... F03D 7/045
    703/18

(Continued)

FOREIGN PATENT DOCUMENTS

CN    1505735 A    6/2004
CN    1906409 A    1/2007

(Continued)

OTHER PUBLICATIONS

SIPO First Office Action for Application No. 201480075088,1 dated Apr. 4, 2018.

(Continued)

*Primary Examiner* — Justin D Seabe
(74) *Attorney, Agent, or Firm* — Patterson + Sheridan, LLP

(57) ABSTRACT

The present invention refers to a method for operating a wind turbine, the wind turbine particularly comprising a tower and a rotor with rotor blades. The pitch angles of the rotor blades are adjusted to generate a force on the rotor and the tower. The force is adjusted to counteract and damp an (Continued)

oscillation. The adjustment is enabled by an activation decision unit, if the activation decision unit decides that certain parameters characterising the oscillation or loads of the tower indicate a requirement and/or if the activation decision unit determines that the generated force is sufficient to counteract an oscillation of the tower. In various embodiments the parameters characterising the oscillation or loads of the tower comprise current oscillations and their amplitude, an estimate of loads incurred in the turbine structure, an estimate whether damping in the near future might become necessary, an indication whether a different oscillation damping algorithm than individual blade pitch control is currently performing, and an indication whether a wind speed is above a certain portion of a rated wind speed.

22 Claims, 6 Drawing Sheets

(52) U.S. Cl.
CPC ........... *F03D 7/0272* (2013.01); *F03D 7/043* (2013.01); *F03D 9/25* (2016.05); *F05B 2220/706* (2013.01); *F05B 2240/2211* (2013.01); *F05B 2260/821* (2013.01); *F05B 2260/964* (2013.01); *F05B 2270/334* (2013.01); *Y02E 10/723* (2013.01); *Y02E 10/725* (2013.01)

(56) References Cited

U.S. PATENT DOCUMENTS

2009/0263245 A1* 10/2009 Shi ........................ F03D 7/02 416/43
2010/0289266 A1 11/2010 Wortmann et al.
2011/0204636 A1* 8/2011 Scholte-Wassink ........................ F03D 7/0296 290/44
2011/0229300 A1* 9/2011 Kanev ................... F03D 7/0224 415/1
2012/0133134 A1 5/2012 Scholte-Wassnik et al.
2013/0195653 A1* 8/2013 Hayashi ................ F03D 7/0296 416/1
2013/0209254 A1 8/2013 Hess et al.

FOREIGN PATENT DOCUMENTS

| | | |
|---|---|---|
| CN | 101300422 A | 11/2008 |
| CN | 102317622 A | 1/2012 |
| CN | 102536670 A | 7/2012 |
| EP | 1719910 A1 | 11/2006 |
| EP | 2463517 A1 | 6/2012 |
| EP | 2623776 A2 | 8/2013 |
| WO | 2007/010322 A1 | 1/2007 |
| WO | 2007/053031 A1 | 5/2007 |
| WO | 2007/089136 A2 | 8/2007 |

OTHER PUBLICATIONS

International Search Report for PCT/DK2014/050416, dated Mar. 12, 2015.
Danish Search Report for PA 2013 70751, dated Oct. 31, 2014.
Klauco Martin et al: "Frequency weighted model predictive control of wind turbine", 2013 International Conference on Process Control (PC), IEEE, Jun. 18, 2013, pp. 347-352.

* cited by examiner

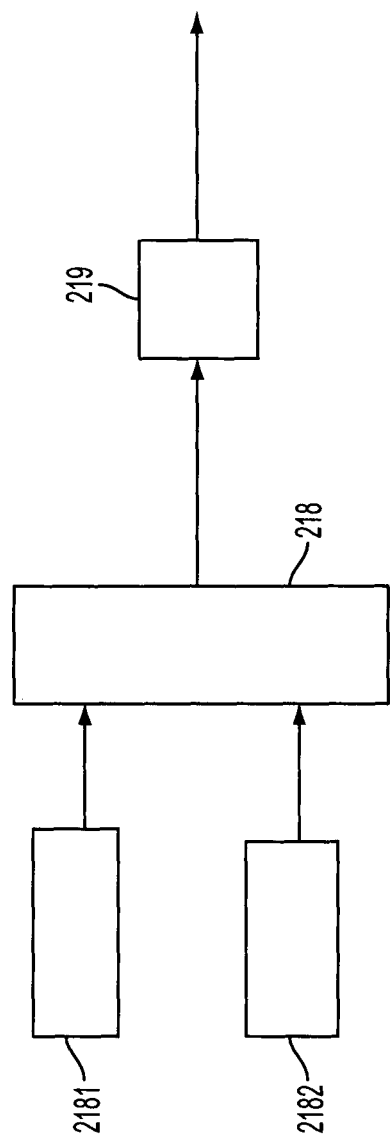

SELECTIVE WIND TURBINE DAMPING USING ACTIVE DAMPING SYSTEM

BACKGROUND OF THE INVENTION

The present invention is directed to a method for operating a wind turbine in order to damp oscillations of a tower of the wind turbine and a control device performing the method.

DESCRIPTION OF THE RELATED ART

A wind turbine as known in the art comprises a wind turbine tower and a rotor. The rotor is positioned on top of the tower and comprises a hub holding a number of rotor blades. Each rotor blade has a blade axis extending along the largest dimension of the blade, the blade length. The blade axis extends perpendicularly or askew to the rotor axis. The rotor is adapted to drive a generator. An exemplary wind turbine with a horizontal axis rotor configuration is illustrated in FIG. 1. Such wind turbines are commonly referred to as horizontal axis wind turbines. In most cases, the hub is oriented to the side of the tower which side is exposed to wind, the upwind side, at all times.

Both, the tower and the rotor blades are prone to oscillations. Such oscillations may be due to cyclic rotor forces and to inhomogenities in a wind field. Particularly, imbalances in a rotor lead to an excitation and forces perpendicular to the rotor axis. The wind field may be inhomogenous, as obstacles in front of the wind turbine partially slow down the wind. When the rotor blades sweep the area behind such an obstacle, the rotor is exposed to lower forces than the other rotor blades. Further, due to frictional forces on the ground, the wind in higher areas has usually higher wind speeds than the wind closer to ground. A higher wind speed leads to additional forces on the rotor blade.

Essentially, the rotor blade experiences two forces from the wind. A first force is due to the air drag of the rotor blade and is directed in parallel to the wind. This drag force leads to tilting and yawing moments on the rotor and thus, if not balanced by the other rotor blades, to a sideways force on the tower. A second force is perpendicular to a blade axis and to the rotor axis and is due to the aerodynamic properties of the rotor blade. This aerodynamic force provides a momentum about the rotor axis and conventionally causes the rotor to rotate. If the aerodynamic force is paired symmetrically to the rotor axis by the aerodynamic forces of the other rotor blades, their directions and magnitudes compensate each other such that there is no resulting sideway force on the rotor axis. However, if the aerodynamic forces are not balanced, a resulting force on the rotor axis acts perpendicularly on the rotor axis. Such resulting force may lead to a lateral oscillation of the tower, particularly if it is variable over time.

For example, every time a wind turbine blade sweeps the highest area of the rotor area, where the highest wind speeds prevail, a resulting aerodynamic force on the rotor axis will occur with a frequency of the rotational frequency of the rotor multiplied by the number of rotor blades, for example, three times the rotational frequency of the rotor. The sideway forces due to mechanical imbalances of the rotor will particularly have a frequency equal to the rotational frequency of the rotor. Additionally, the drag force on the rotor blade causes a precession force on the rotating rotor, which precession force in the given example is directed perpendicularly to the rotor axis and parallel to ground.

Of course, since the tower is covered from wind every time a blade sweeps by, the resulting frequent change of the overall aerodynamic resistance of the tower may also lead to a longitudinal oscillation parallel to wind. Various other effects such as a change in the wind field or negative damping action of a collective pitch control are known by the skilled person and may likewise lead to longitudinal oscillations.

The aerodynamic force a rotor blade produces is essentially due to its wing-like shape and to its current angle with respect to wind. While the shape of the rotor blade is hardly varied, the hub is adapted to pitch the rotor blade angle with respect to wind such that the angle can be optimised by means of a blade pitch control device. The blade pitch adjustment then influences the aerodynamic and drag forces on the rotor blades. The blade pitch adjustment is usually carried out about an axis which is in parallel to the blade axis. The adjustment is carried out by a blade pitch control unit based on a collective reference pitch, also known as a collective reference pitch angle, for all blades.

Usually, a blade pitch adjustment is optimised to maximise an energy harvest, particularly in times of energy shortages or when the power of the wind is not enough to produce rated power, or the blade pitch adjustment is adapted to provide a constant power level or generator torque as stable as possible. To this end, a rotational speed of the rotor is adjusted according to a current optimisation criterion by adjusting the blade angles.

The adjustment of the blade pitch to adjust drag and aerodynamic forces may also be used to counteract oscillations of the tower. Particularly, a collective adjustment of the blade pitch can be used to counteract wind parallel oscillations, i.e. longitudinal oscillations. For the collective blade pitch adjustment each rotor blade is adjusted by an equal pitch angle.

An individual blade pitch adjustment may be used to counteract a lateral oscillation of the tower. The individual blade pitch adjustment provides different angles for each rotor blade. This adjusts a resulting sideway force by a corresponding adjustment of the aerodynamic forces. The blade pitch for individual blade pitch adjustment is varied depending on, i.a., a phase of an oscillation or an angular position of the rotor blade during a rotation.

In further embodiments of an oscillation damping system, the rotational speed of the rotor is adjusted such that rotationally induced forces on the wind turbine structure or a rotation of the rotor have frequencies different from a natural frequency of the tower or other parts of the wind turbine structure. In some embodiments the rotational speed is adjusted by adjustment of the blade pitch angle.

However, recently it has been found that these adjustments presented above impart an energy harvest of the wind turbine and cause wear and tear of the blade bearings of each rotor blade.

EP 2 225 461 B1 discloses a method for operating a wind turbine generator system, wherein the wind turbine generator system includes a tower and a rotor with at least two rotor blades connected to the tower, wherein each rotor blade is adjustable about a respective rotor blade axis to a predetermined rotor blade adjustment angle, wherein the rotor blade adjustment angle is altered individually for each rotor blade to damp lateral oscillations of the tower.

WO 2007/053 031 A1 refers to a method for damping tower vibrations in a wind turbine, particularly a floating wind turbine installation. The tower's vibrations are damped by, in addition to control with the controller in the constant power or RPM range of the wind turbine, an increment being added to the blade angle of the wind turbine blades on the basis of the tower velocities to counteract eigenvibrations.

It is an object of the present invention to overcome shortcomings of the methods and systems laid out above.

SUMMARY OF THE INVENTION

While the invention is defined in the independent claims, further aspects of the invention are set forth in the dependent claims, the following description and the drawings.

According to a first aspect, the invention provides a method for operating a wind turbine, the wind turbine comprising a tower and a rotor with at least one rotor blade, the rotor being connected to the tower and being adapted to drive a generator, wherein a pitch angle of each rotor blade is adjustable. The method comprises detecting an oscillation of the tower, and enabling damping the oscillation of the tower. Enabling damping the oscillation comprises determining a requirement to damp the oscillation, determining a resulting damping effect under the condition that damping the oscillation of the tower will be enabled, and enabling damping the oscillation based on the determined requirement to damp and on the determined resulting damping effect.

According to a second aspect, the invention further provides a wind turbine comprising a tower and a rotor with at least one rotor blade, the rotor being connected to the tower and being adapted to drive a generator, wherein a pitch angle of each rotor blade is adjustable. The wind turbine further comprises a detecting member adapted to detect an oscillation of the tower, and a damping member adapted to damp the oscillation of the tower.

The wind turbine also comprises an enablement member which is adapted to enable damping the oscillation, a requirement member adapted to determine a requirement to damp the oscillation, and a damping effect member adapted to determine a resulting damping effect. The enablement member is adapted to enable damping the oscillation based on a combination of the output of the requirement member and the damping effect member.

Embodiments of the invention are also defined in the dependent claims.

BRIEF DESCRIPTION OF THE DRAWINGS

Embodiments of the present invention are explained by example with respect to the accompanying drawings, in which:

FIG. 4 illustrates a subblock of the control logic according to FIGS. 3A and 3B.

DETAILED DESCRIPTION OF EMBODIMENTS

Figure 1:
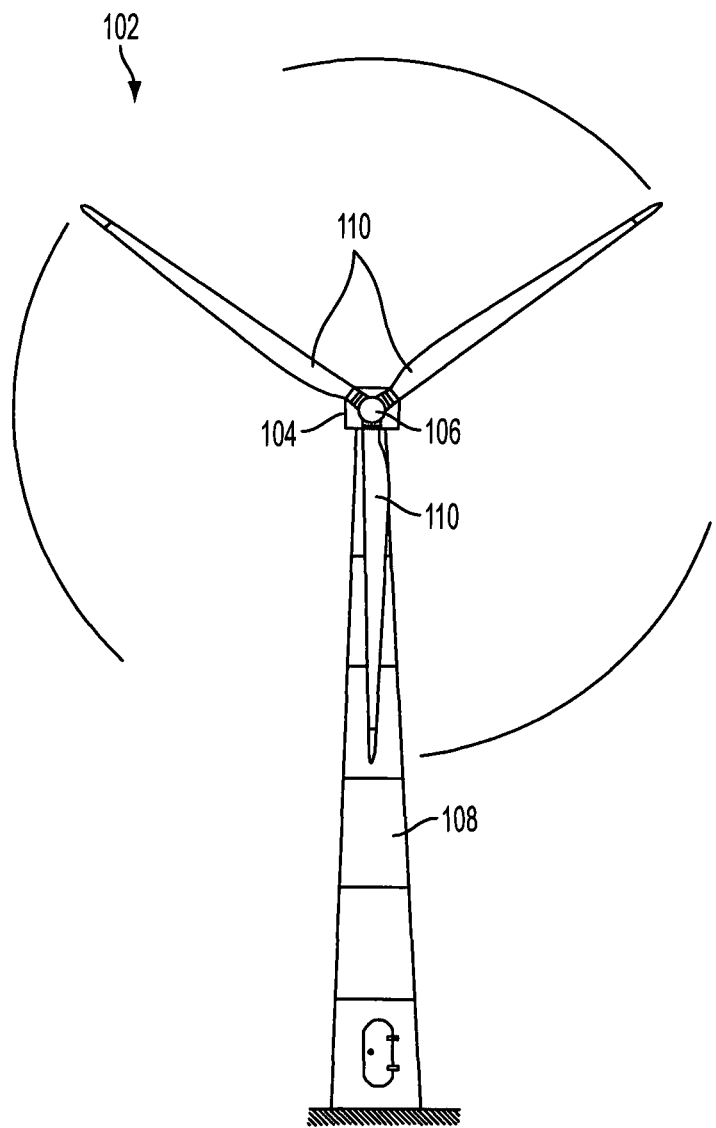
FIG. 1 illustrates a wind turbine according to the state of the art, as seen from the front.

FIG. 1 shows a wind turbine 102 with a nacelle 104, and a rotor hub 106 pivotally mounted to the nacelle 104 via a rotor shaft. The rotor shaft extends from the rotor hub 106 facing away from the viewer and is therefore not shown. The nacelle 104 is mounted on a wind turbine tower 108 via a rotary joint. The wind turbine tower 108 is connected to ground at its root at the opposite end to the nacelle 104. The rotor hub 106 of the wind turbine includes three wind turbine blades 110 attached to the rotor hub 106. The rotor hub 106 is adapted to rotate about its axis of rotation, which is aligned to an axis of rotation of the rotor shaft, such that the rotor blades 110 sweep a rotational plane substantially perpendicular to the axes of rotation. The axes of rotation are essentially parallel with respect to ground, i.e., parallel or tilted by a tilt angle of some degrees with respect to ground. The tilt angle is the angle of the axis of rotation of the rotor shaft of the wind turbine with respect to ground.

To counteract lateral oscillations, the rotor blades may be pitched individually to generate appropriate sideways forces. The sideways forces are generated using a cyclic pitch actuator. Reference Pitches $\vartheta_i$ for three rotor blades are of the form:

$$\vartheta_1 = \vartheta_0 + \vartheta_c \cos(\varphi) \quad (1)$$
$$\vartheta_2 = \vartheta_0 + \vartheta_c \cos\left(\varphi - \frac{2\pi}{3}\right)$$
$$\vartheta_3 = \vartheta_0 + \vartheta_c \cos\left(\varphi - \frac{4\pi}{3}\right)$$

where $\vartheta_0$ is a collective reference pitch, $\vartheta_c$ is the cyclic amplitude that needs to be adjusted in order to create a required sideways force, and $\varphi$ is a rotational angle of the rotor. In an embodiment, $\varphi$ has its origin at the bottom apex angle of the rotation, such that $\vartheta_i$ has its maximum with the rotor blade at the bottom apex angle and its minimum at the top apex angle. If the maximum shall be turned to a different rotational angle, $\varphi$ may be replaced by $\varphi_{shift}=\varphi-\varphi_p$ where $\varphi_p$ indicates a phase shift angle, such that $\vartheta_i$ has its maximum at the phase shift angle $\varphi_p$. Under constant conditions, in order to generate a constant sideways force, the cyclic amplitude $\vartheta_i$ must be chosen constant. When using the sideways force for active tower damping, it has to be periodic with the tower eigenfrequency $f_e$:

$$\vartheta_c = \vartheta_{c,max} \cos(2\pi f_e t) \quad (2)$$

Each blade of a rotor induces an individual blade force $F_x$ in a direction perpendicular to the respective blade and lateral to the wind that can be derived from the rotor power $P_{rot}$:

$$F_x = \frac{P_{Rot}}{3\omega R_A}$$

where $R_A$ is the radius where the aerodynamic forces attack, and $\omega$ a rotational speed of the rotor. With the approximation $R_A=R/2$, where R is the rotor radius, this turns into $$F_x = \frac{2P_{Rot}}{3\omega R} \quad (3)$$

The total sideways force $F_{side}$ is a geometric addition of the individual blade forces $F_x$ $$F_{side} = F_{x,1}\cos(\varphi) + F_{x,2}\cos\left(\varphi - \frac{2\pi}{3}\right) + F_{x,3}\cos\left(\varphi - \frac{4\pi}{3}\right) \quad (4)$$

As indicated above, $\varphi$ may be replaced by $\varphi_{shift}=\varphi-\varphi_p$ where $\varphi_p$ indicates a phase shift angle, and may be adjusted to direct the total sideways force $F_{side}$. In ideal conditions, the individual forces have the same magnitude, and the resulting sideways force is zero. When varying the pitch angle, the sideways forces change accordingly:

$$F_x = F_{x,0} + \frac{dF_x}{d\vartheta}(\vartheta - \vartheta_0)$$

When applying the cyclic pitch function from (1), the constant terms go off and only the cyclic part of the sideways force contributes. This results in $$F_{side} = \frac{3dF_x}{2d\vartheta}\vartheta_c \quad (5)$$

Together with the sideways sensitivity $$\frac{dF_x}{d\vartheta} = \frac{2}{3\omega R}\frac{dP}{d\vartheta}$$

this results in the sensitivity function $$\frac{F_{side}}{\vartheta_c} = \frac{1}{\omega R}\frac{dP}{d\vartheta} \quad (6)$$

indicating a dependency of a sideways force $F_{side}$ to a cyclic amplitude $\vartheta_c$, a variation of the rotor power P with respect to the pitch angle $\vartheta$ and the rotational speed $\omega$.

To counteract longitudinal oscillations, the collective reference pitch is adjusted to provide more or less static or dynamic aerodynamic resistance force and thereby avoiding conditions causing longitudinal oscillations or delivering a damping counterforce.

However, lateral oscillations may also be counteracted by adjustment of the generator output. To this end the electric current in the generator is controlled.

When reducing the electric current a counter torque of the rotor decreases and the rotor is allowed to spin faster. As a reaction from the decreased counter torque, a sideways generator torque induced force on the tower about its root is decreased. Likewise, when increasing the electric current, the counter torque of the rotor increases and the sideways generator torque induced force on the tower about its root increases. By varying the counter torque over time in dependence on the cyclic pattern of the sideways oscillation, the resulting generator torque induced force can be controlled to weaken the lateral oscillation. In other words, the counter torque can be varied so as to oppose the lateral oscillation, for example as measured by an accelerometer.

By varying the electric current the rotational speed of the rotor is varied accordingly as mentioned above. This also leads to a variation of an aerodynamic resistance of the rotor. The variation can be adjusted to counteract a longitudinal oscillation.

In wind conditions below rated wind speed, it has been found that a capability of damping sideways oscillations by generator torque induced force adjustment is usually higher than a capability of damping by pitch force adjustment. However, in wind conditions above rated wind speed, the capability of damping sideways oscillations by pitch force adjustment is usually higher than the capability of damping by generator torque induced force adjustment.

Before proceeding further with the detailed description of the embodiments of the invention, some general aspects of the method are discussed. A method for operating a wind turbine, the wind turbine comprising a tower and a rotor with at least one rotor blade, the rotor being connected to the tower and being adapted to drive a generator, wherein a pitch angle of each rotor blade is adjustable, comprises detecting an oscillation of the tower, and selectively enabling damping the oscillation of the tower. Enabling damping the oscillation comprises determining a requirement to damp the oscillation, determining a resulting damping effect if enabling damping the oscillation of the tower will be selected, and selecting enabling damping the oscillation based on the determined requirement to damp and on the determined resulting damping effect.

The determination of the resulting damping effect may be expressed as a feasibility to damp the oscillations if enabling damping the oscillation of the tower will be selected, so that the selecting enabling damping of the oscillation is based on the determined requirement to damp and on the determined feasibility to damp. The feasibility to damp may express the possibility that the damping effect of the selected damping action will result in a given, required or desired damping of the tower.

In some embodiments determining a requirement to damp the oscillation is based on at least one of a detected oscillation of the tower reaches an oscillation threshold, an indication whether a different oscillation damping control algorithm is operating, such as a different lateral oscillation damping control algorithm, an indication whether a passive tower damper is operating, a load in the wind turbine if enabling damping the oscillation of the tower will be selected, a relation between a current wind speed and a rated wind speed, and a prediction of the lateral oscillation of the tower.

If a passive tower damper is operating, such as a pendulum in oil installed inside the tower, both active damping and passive damping may be used at the same time, or active damping may be selected not to be enabled, e.g. if the requirement to damp is fulfilled by the passive damper, and/or if the resulting damping effect of the active damper does not necessitate to enable it. A passive damper may provide safety for when the turbine cannot produce (or is not grid connected) while the active damper may add additional levels of damping to extend the lifetime of the structure and mitigate relevant risks (like the pendulum hitting the walls of the tower). The passive damper is typically most effective in the low wind speed region, whilst the sideways damping effectiveness increases at increasing wind speeds. The effects of the two damping means are additive and give a resulting higher damping level.

In some embodiments determining the resulting damping effect is based on at least one of a resulting sideways force that can be generated by individually adjusting the pitch angle, a difference between the pitch angles of the rotor blades and optimal pitch angles, pitch force sensitivity (dF/d$\vartheta$), a relation between a current power and a rated power, a relation between a current wind speed and a rated wind speed, a resulting sideways force that can be generated by generator torque induced force adjustment, and an operating point of the wind turbine.

In embodiments, the turbine blades may comprise flaps. In such embodiments, the selecting enabling damping the oscillations may include activating the flaps.

In some embodiments the determined requirement to damp and the determined resulting damping effect are combined to generate a value grading the enablement, and damping the oscillation is enabled according to the value grading the enablement, the value grading the enablement being provided as one of two distinct values, a first value enabling no oscillation damping and a second value enabling full oscillation damping.

In some embodiments the determined requirement to damp and the determined resulting damping effect are combined to generate a value grading the enablement, and damping the oscillation is enabled according to the value grading the enablement, the value grading the enablement being provided as one of at least three distinct values, a first value enabling no oscillation damping, a second value enabling full oscillation damping and an additional value providing a distinct grading of oscillation damping enabling between no oscillation damping and full oscillation damping. In further embodiments the value grading the enablement is provided as one of an infinitesimal number of distinct values, or is a continuous function between the first value enabling no oscillation damping and the second value enabling full oscillation damping.

In some embodiments, the requirement to damp may also be based on an input which limits the oscillation damping, or even disables the oscillation damping. This may be implemented by limiting the value grading the enablement to a specific level, including zero. In a situation where a plurality of tower oscillation damping actions may selectively be enabled, the requirement to damp may be based on an input which limits or disables the oscillation damping of a specific or given tower oscillation damping action. In particular, it may be desired to limit or disable oscillation damping by generator torque induced force adjustment, since forced variations of the generator torque may propagate into the power grid in a manner which is not desired or even prohibited in order to fulfil given grid codes.

In some embodiments the oscillation of the tower is a lateral oscillation. In other embodiments, the oscillation of the tower is fore-apt oscillation.

In further embodiments damping the lateral oscillation comprises individual pitch angle adjustment.

In further embodiments damping the lateral oscillation comprises generator torque adjustment.

In further embodiments damping by individual pitch angle adjustment is performed in order to reduce a control action of a different lateral oscillation damping control algorithm.

In some embodiments the oscillation of the tower is a longitudinal oscillation.

In some embodiments the load in the wind turbine if enabling damping the oscillation of the tower will be selected includes a main bearing tilt moment and/or a rate of accumulation of blade bearing fatigue.

In some embodiments the oscillation of the tower is predicted by measuring an edgewise moment and deriving the edgewise moment over time in order to receive an indication of its development and/or by measuring a wind field in an area around the wind turbine. The term "edgewise" indicates a direction tangential to a rotation curve of a point on a rotor blade about the rotor axis. Hence, the edgewise moment is a moment about the rotor axis and can be measured from a blade strain or a rotor shaft torsion. In some embodiments data regarding the wind field is collected from measurements and performances of adjacent wind turbines and from weather forecasts for the area of the particular wind turbine.

In some embodiments the different lateral oscillation damping control algorithm adjusts a rotational speed of the rotor such that the rotor induced oscillations have a frequency different from a natural frequency of the tower.

In some embodiments the operating point is defined by at least one of a wind speed, a collective reference pitch, a power produced by the generator, rated power, a generated torque and a generator speed.

In some embodiments the operating point is defined by a pair of the group consisting of a wind speed, a collective reference pitch, a power produced by the generator, rated power, a generated torque and a generator speed.

In further embodiments the damping effect, that can be generated from a particular individual blade pitch adjustment and at a particular operating point, is calculated before operating the wind turbine and stored in a lookup table. In some embodiments the damping effect is particularly based on a sideways force.

In some embodiments enabling to individually adjust the pitch angle comprises a smoothed enablement of the individual adjustment of the pitch angle.

In some embodiments the method further comprises determining a capability to damp the lateral oscillation by means of pitch adjustment by evaluating a difference between the optimal pitch angle for each rotor blade and the current pitch angle of each rotor blade, determining whether an additional capability to damp by means of pitch angle adjustment is required, and if the additional capability to damp is required, increasing the difference between the optimal pitch angle and the current pitch angle.

In some embodiments, the selecting enabling damping the oscillation is based on the determined requirement to damp and on the determined resulting damping effect, comprises determining a tower acceleration and an acceleration alarm limit, and determining, based on the tower acceleration and the acceleration alarm limit, an acceleration alarm distance signal from the distance of the tower acceleration to an alarm limit.

In some embodiments, the oscillation of the tower is a lateral oscillation, and damping the lateral oscillation comprises generator torque induced force adjustment. The generator torque induced force adjustment comprises varying a counter torque of the generator over time in dependence on a cyclic pattern of the lateral oscillation to provide a generator torque induced force that reduces the lateral oscillation.

In embodiments may the method further comprising storing accessible to a controller of the wind turbine control data for a plurality of tower oscillation damping actions, selecting at least one of the tower oscillation damping actions for which control data is stored, and damping the oscillation of the tower with the selected at least one of the tower oscillation damping action.

The tower oscillation damping actions, for which control data is stored, may comprise damping by means of blade pitch angle adjustment. In the event that the oscillation of the tower is a lateral oscillation, the blade pitch angle adjustment generates sideways forces that counteract the lateral oscillation.

The tower oscillation damping actions, for which control data is stored, may comprise adjusting a rotational speed of the rotor such that rotor induced oscillations have a frequency different from a natural frequency of the tower.

The tower oscillation damping actions, for which control data is stored, may comprise generator torque induced force adjustment. In the event that the oscillation of the tower is a lateral oscillation, the generator torque induced force adjustment may vary a counter torque of the generator over time in dependence on a cyclic pattern of the lateral oscillation to provide a generator torque induced force that reduces the lateral oscillation.

The at least one of the tower oscillation damping actions, for which control data is stored, may be selected based on the determined requirement to damp and on the determined resulting damping effect.

In some embodiments of the method the optimal pitch angle, the wind condition and/or the output requirement of the generator determine a collective reference pitch and the current pitch angle is adjusted according to the collective reference pitch. In further embodiments the current pitch angle of each rotor blade is varied additionally as a function of a rotational angle of the rotor. In further embodiments the current pitch angle of each rotor blade is varied additionally to provide a resulting sideways force.

In some embodiments the optimal pitch angle for each rotor blade is a function of the wind condition, a generator torque and/or a rotational angle of the particular rotor blade.

In some embodiments the determined resulting damping effect is based on determining the capability to damp.

In the following we will particularly describe an activation of individual blade pitch controlled lateral oscillation damping. However, the principles likewise apply for damping oscillations by adjustment of the generator torque induced force.

Figure 2:
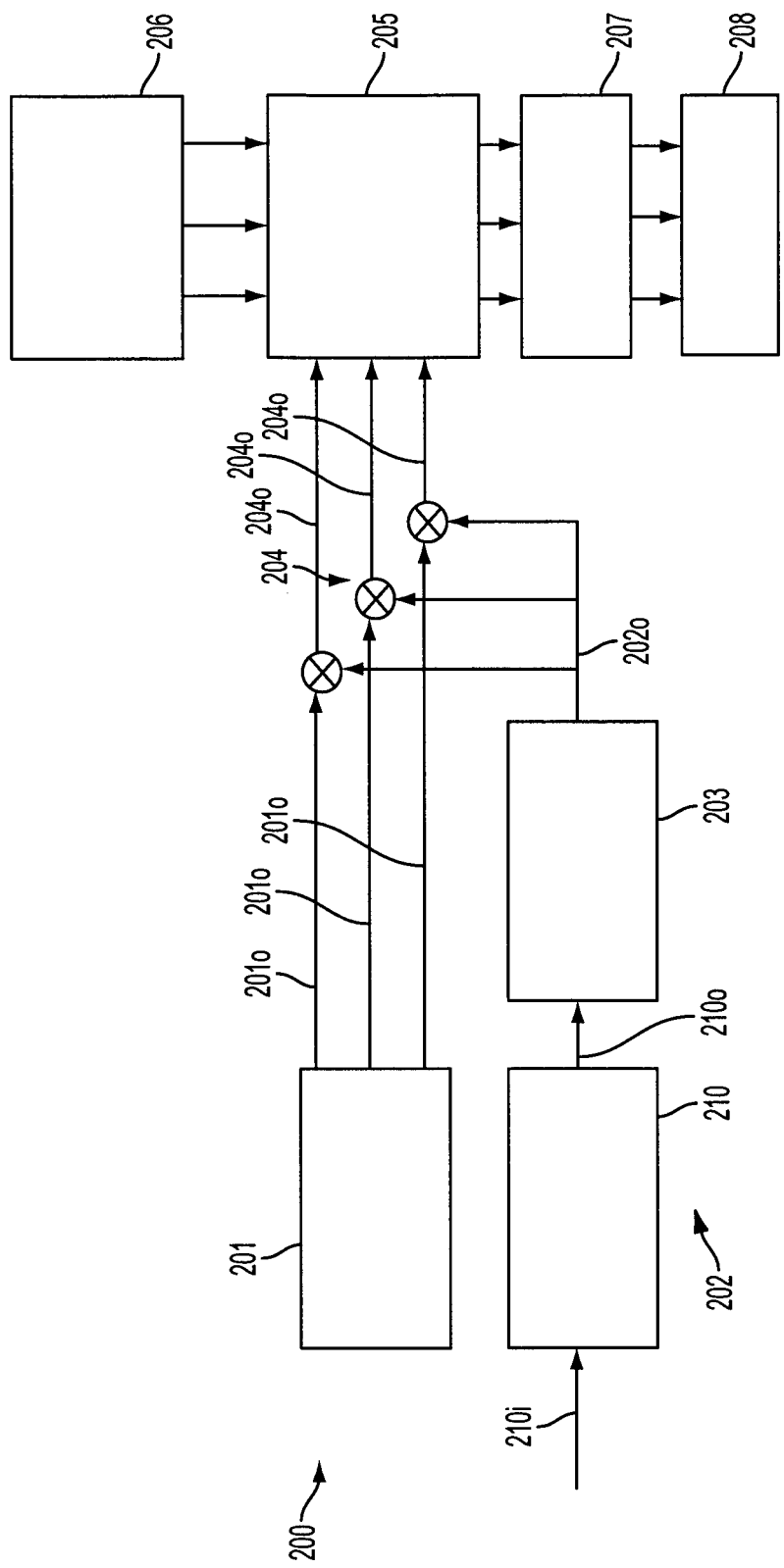
FIG. 2 illustrates a flow chart of a control system for a rotor blade adjustment according to the invention.

FIG. 2 shows a control logic 200 comprising a sideways damping controller module 201 and an activation decision module 202. The sideways damping controller module 201 generates an offset pitch angle 201o individually for each blade. A blade pitch control unit 205 combines the offset pitch angles with reference pitches $\vartheta_0$ coming from a pitch curve unit 206. In some embodiments the blade pitch control unit 205 combines the offset pitch angles with reference pitches $\vartheta_0$ by summing the reference pitches $\vartheta_0$ and the offset pitch angles. The blade pitch control unit 205 sends the combined pitch angles to low level pitch controllers 207 controlling respective blade pitch drives 208. The offset pitch angles 201o are provided to offset a given pitch reference of each rotor blade 110 to counteract an oscillation of the wind turbine in a direction lateral to wind. In some embodiments, the given reference pitch is provided based on an optimum pitch curve. However, in wind conditions above rated wind speed the reference pitch is adjusted to deliver a power output close to a rated power output.

The activation decision module 202 comprises an activation decision unit 210. The activation decision unit 210 receives various parameters as its input 210i and outputs an indication 210o whether individual blade pitch controlled oscillation damping shall be performed and/or in how far oscillation damping shall be performed. For example, an output value of the activation decision unit 210 is between logic "zero" and logic "one" indicating that no blade pitch controlled oscillation damping shall be performed and full blade pitch controlled oscillation damping shall be performed, respectively. In an embodiment the activation decision module 202 also comprises a smoothing unit 203.

The smoothing unit 203 provides for a continuous transition of the output of the activation decision unit 210 and particularly avoids steps between consecutive output values, i.e. a smoothed output of the activation decision unit 210. In an embodiment the smoothing unit 203 provides a slope function proportional to the output of the activation decision unit 210 as an output. In further embodiments the smoothing unit 203 also provides a hysteresis of the activation decision, such that an activation decision is maintained for an extended period of time, even if the parameters leading to the activation decision change in a way that an activation decision is revised shortly after the activation decision was released. In further embodiments such hysteresis is performed in the activation decision unit 210.

The output 202o of the activation decision module 202 is combined with the outputs 201o of the sideways damping controller 201. In the depicted embodiment the output 201o of the sideways damping controller 201 is multiplied with a gain value output by the activation decision module 202 in multipliers 204, wherein each of the multipliers processes one offset pitch angle for a respective rotor blade 110. In this embodiment it is assumed that an amendment of the offset pitch angle is proportional to an amendment of the resulting sideways force. However, in further embodiments the output 202o of the activation decision module 202 is combined with the outputs 201o of the sideways damping controller 201 in a way that the amendment of the sideways force is also truly proportional to the output 202o of the activation decision module 202.

Accordingly, if the sideways damping controller 201 provides offset pitch angles 201o and the activation decision module 202 provides a gain value indicating that an activation shall take place, for example by outputting a logic "one", the offset pitch angles are multiplied by "one" and therefore remain unamended. The unamended offset pitch angles are provided as outputs 204o of the multipliers 204 to the blade pitch control unit 205. In the blade pitch control unit 205 the unamended offset pitch angles 204o are added to collective pitch references $\vartheta_0$ coming from the pitch curve unit 206 prior to being sent as pitch angle references of each rotor blade to low level pitch controllers 207. The low level pitch controllers adjust the blade pitch drives 208 for each rotor blade accordingly.

However, if the activation decision module 202 provides a gain value indicating that no activation of the damping shall take place, for example by outputting a logic "zero", the offset pitch angles are multiplied by "zero" and no offset pitch angles are provided to the blade pitch control unit 205. The low level pitch controllers 207 receive the pitch references coming from the pitch curve unit 206.

In some embodiments, the optimum pitch curve is determined by evaluating a pitch curve which provides a maximum power output. In the embodiments, the optimum pitch curve is a mapping that provides a pitch angle set for a given wind speed below a rated power of the generator and/or below rated wind speeds. In further embodiments the optimum pitch curve is a mapping that provides a pitch angle set for every pair of wind speed and generator torque. The pitch angle set determines a respective pitch angle for each rotor blade at a respective rotational angle. In some embodiments the optimum pitch curve is calculated offline. In further embodiments the optimum pitch curve is determined or verified by trials at operating wind turbines. Particularly, the optimum pitch curve is evaluated to produce a maximum power from a given wind for wind conditions from calm conditions to rated wind speed. In further embodiments the optimum pitch curve is evaluated to deliver a maximum rotor torque or a minimum noise. In wind conditions above rated wind speed the pitch angle set is adjusted to deliver a power output close to a rated power output.

In embodiments where the activation decision modules provide a gain value indicating that only some damping shall be performed, for example by outputting a value larger than "zero" and smaller than "one", the offset pitch angle 2010 is multiplied by the gain value and modified accordingly. Then, the reduced offset pitch angle is provided at the outputs 204o of the multipliers 204 to the blade pitch control unit 205 to adjust the rotor blades 110 such that only some damping is performed. In further embodiments the offset pitch angel 2010 is modified such that the resulting sideways force is proportional to the gain value.

Figure 3A:
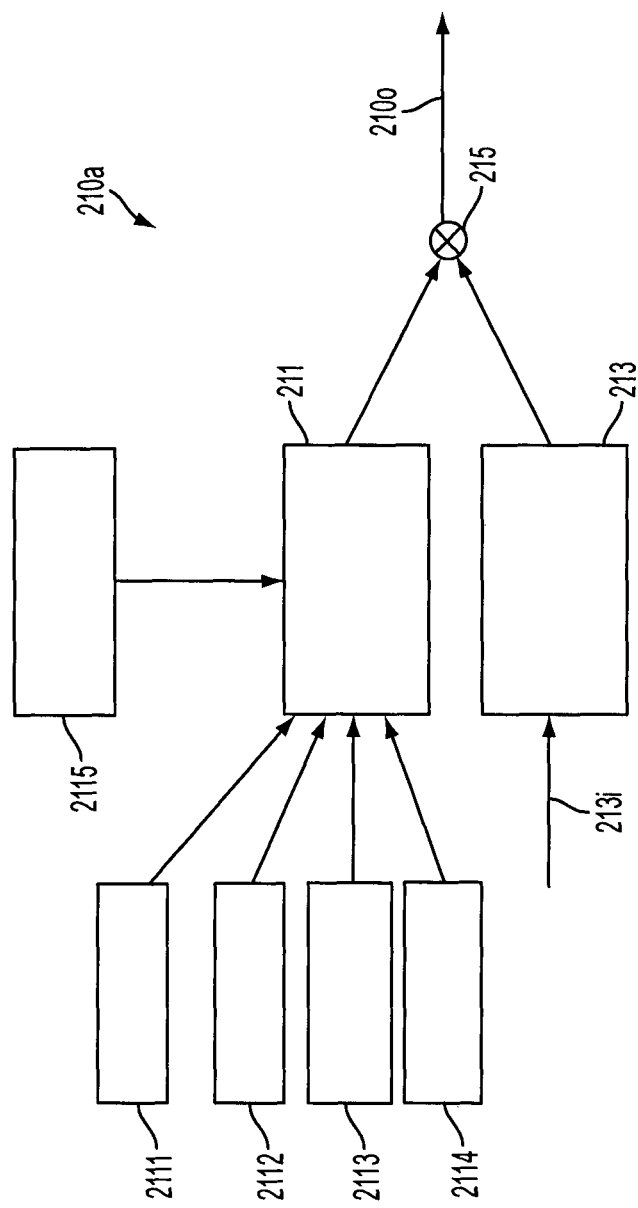
FIG. 3A shows a subblock of the control system according to FIG. 2.

FIG. 3A illustrates an embodiment of the activation decision unit 210a comprising a requirement unit 211 and force estimate unit 213. The requirement unit 211 receives various parameters as its input 211i concerning at least one of current oscillations and their amplitude, an estimate of loads incurred in the turbine structure, an estimate whether damping in the near future might become necessary, an indication whether a different oscillation damping algorithm than individual blade pitch control is currently performing, and an indication whether a wind speed is above a certain portion of a rated wind speed in various embodiments. The requirement unit 211 will output an indication whether oscillations shall be damped.

In one embodiment each of these parameters will receive a logic value "one" or "zero" depending on whether its value makes damping desirable or not, respectively. In a particular embodiment all values are combined in an OR-function such that if one value indicates that oscillation damping will be desirable, the requirement unit 211 will output such desire. In a different embodiment, all of these values are added up and divided by the number of parameters such that a number between "zero" and "one" is provided as an output of the requirement unit 211. In this embodiment, a requirement to damp will be output if the number is above a certain threshold. In further embodiments, each value is considered according to a weighing factor to prioritise certain parameters. The requirement unit 211 will indicate the requirement to damp by outputting a logic "one". If no damping is required, the requirement unit 211 will output a logic "zero".

In some embodiments, an oscillation threshold member 2111 indicates parameters characterising an oscillation of the tower 108. In further embodiments, to determine the oscillations, a root mean square value of a lateral tower acceleration is used by the oscillation threshold member. In particular embodiments the oscillation threshold member compares the root mean square of the acceleration to a predetermined oscillation threshold. If the oscillation threshold is reached, the oscillation threshold member outputs a logic "one". As long as the oscillation does not reach the oscillation threshold, the oscillation threshold member outputs a logic "zero".

In some embodiments, a load estimate member 2112 provides an estimate of loads on components of the wind turbine from damping the lateral oscillations by individually adjusting the pitch angles. Particularly, components of the wind turbine, which are particularly prone to large loads, are considered. Such components prone to large loads are blade bearings at the rotor hub 106 and a main bearing providing a connection between the tower 108 and the nacelle 104. Such estimate could be based for instance on an indication of decay of a particular component until a current point in time and could be correlated with damping actions until that point in time to deduce a prediction of the load due to a damping action. For example, a rate of accumulation of the blade bearing fatigue at a current point in time could be correlated with pitch motion. If the rate of accumulation indicates a particular sensitivity to a particular pitch motion, the load estimate member 2112 outputs a logic "zero" to indicate that no individual pitch adjustment damping is desirable if the particular pitch motion would be demanded. If the rate of accumulation indicates that a sensitivity to a particular pitch motion is below a certain threshold, the load estimate member 2112 outputs a logic "one". For this example, the rate of accumulation of the blade bearing fatigue at a given point in time is calculated as the cube of the resultant blade root moment multiplied by a pitch velocity. A certain acceleration of the tower will be tolerated before enabling the individual pitch adjustment damping, if the sensitivity of the blade bearing to the particular pitch motion is so high that an estimated blade bearing decay rate due to the particular pitch motion exceeds a predetermined blade bearing decay rate by more than a decay rate tolerance value.

In some embodiments, an oscillation prediction member 2113 is adapted to deduce an estimate concerning an oscillation of the tower in the near future and to determine whether damping in the near future is desirable. The oscillation prediction member retrieves data of a current acceleration or force on the tower, particularly in a lateral direction. If such an acceleration acts laterally on the tower, the oscillation prediction member will detect the acceleration and based thereon will predict if an oscillation will build up based on a model of the tower. If a force acts laterally on the tower, the oscillation prediction member will likewise provide an oscillation estimate based on the tower model and will particularly consider whether the force is varied over time. In an embodiment, the model of the tower particularly comprises the first tower natural frequency. If the force or acceleration varies at a frequency close enough to the natural frequency, such that lateral oscillations can build up, the oscillation prediction member outputs a logic "one" to avoid that oscillations build up. If the force or acceleration varies at a frequency remote from the natural frequency and passive damping effects prevent that oscillations build up, the oscillation prediction member outputs a logic "zero".

In some embodiments, a wind measurement member 2114 indicates whether and how far a wind speed is above a certain portion of a rated wind speed. The wind measurement member 2114 outputs a logic "one" to the requirement unit 211 if the wind speed is above the certain portion of the rated wind speed, otherwise a logic "zero". In certain embodiments the certain portion corresponds to half a rated wind speed.

In some embodiments, an alternative oscillation damping module 2115 is adapted to perform an alternative oscillation damping method which is not based on a provision of force based on individual blade pitch control. In some embodiments, such an alternative oscillation damping method adjusts a rotational speed of the rotor. In these embodiments the alternative oscillation damping module 2115 adjusts the rotational speed such that a rotational frequency is different from a natural frequency of the tower. If the rotational frequency is different from the natural frequency, the natural damping of the tower, e.g. due to friction in the structure, provides enough damping such that oscillations are avoided. Sometimes this will hinder the wind turbine from operating optimally. In some embodiments, the alternative oscillation damping method includes a reduction of the rotational speed set point, and may operate at all wind speeds.

The control of the generator torque induced force as described above constitutes a further alternative oscillation damping method. As stated, by varying the counter torque over time in dependence on the cyclic pattern of the sideways oscillation, the resulting generator torque induced force can be controlled to weaken the lateral oscillation. The generator torque induced force provided by the torque variations can be estimated as $$\Delta F_s = \frac{\Delta P}{\omega h_{\mathit{eff}}}$$

where ΔP is the amplitude of the power changes resulting from the torque variations, ω is the rotor speed, and heff is the effective tower height, which is approximately 60% of real tower height.

In some embodiments, if the alternative damping method is currently operating, the alternative oscillation damping module 2115 will communicate a logic "one" to the requirement unit 211, and otherwise a logic "zero". Damping by individual blade pitch adjustment is performed in order to reduce a control action of the alternative oscillation damping method.

However the application of individual blade pitch control does not exclude the alternative oscillation damping methods. Rather, in some embodiments the alternative oscillation damping method can operate at the same time as individual blade pitch controlled damping.

The force estimate unit 213 receives an operating point of the wind turbine as an input 213i and provides an indication whether sufficient force can be generated as an output 213o. Its function will be discussed further below with reference to FIG. 4. In some embodiments the force estimate unit 213 will indicate that sufficient force can be generated by outputting a logic "one". Otherwise, the force estimate unit will output a logic "zero".

The outputs 211o, 213o of the requirement unit 211 and the force estimate unit 213 are combined with each other. In the embodiment depicted in FIG. 3A a multiplier 215 combines the outputs 211o, 213o of the requirement unit 211 and the force estimate unit 213 by a multiplication, such that if both, the requirement unit 211 and the force estimate unit 213 output a logic "one", the output 210o of the activation decision unit 210a is a logic "one". However, if one or both of the outputs of the requirement unit 211 and the force estimate unit 213 corresponds to a logic "zero", the output 210o of the activation decision unit 210a would be a logic "zero". In further embodiments a similar result is achieved with a logic "AND" gate. In still further embodiments the results are generated with a logic "OR" gate, such that damping is enabled if at least one output is a logic "one". Still further embodiments provide that if a predetermined one of the requirement unit 211 or the force estimate unit 213 output an indication that damping shall be performed while the respective other unit does or does not request damping, the output of the activation decision unit 210a will indicate that damping shall be performed. For example, if the requirement unit 211 is predetermined and indicates that damping is desirable, the activation decision unit 210a outputs that individual blade pitch controlled oscillation damping shall be enabled, even though the force estimate unit 213 indicates that only insufficient force can be generated and an oscillation or its build-up cannot be prevented entirely. However, in this example the requirement unit 211 is arranged, such that only selected conditions lead to damping in disregard of the force estimate unit 213. This way oscillation induced damages to the tower 108 can be reduced and operation of the wind turbine can be maintained while some oscillations take place but only up to a certain limit.

Figure 3B:
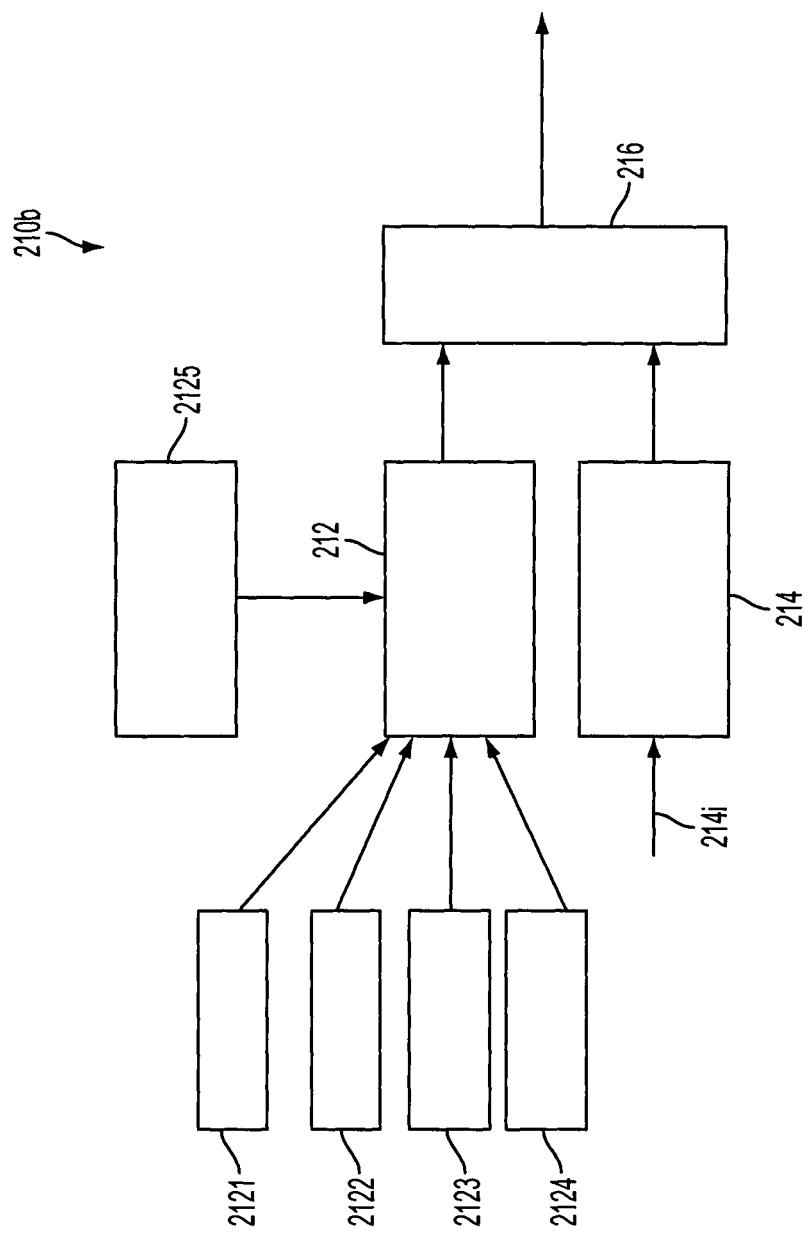
FIG. 3B illustrates an alternative flow chart of a subblock of the control system according to FIG. 2.

FIG. 3B illustrates an alternative embodiment of the activation decision unit 210b. The activation decision unit comprises a requirement evaluation unit 212 and a force estimate evaluation unit 214. The requirement evaluation unit 212 receives an input corresponding to the inputs of the requirement unit 211 and outputs a value indicating an evaluation of a need to damp oscillations. In some embodiments the requirement evaluation unit 212 is adapted to provide at least three distinct values indicating a grading of how desirable an oscillation damping would be. For example, the at least three distinct values refer to a first value indicating that no oscillation damping is desired, a second value indicating that some oscillation damping is desired and a third value indicating that all possible oscillation damping is desired. In some embodiments the requirement evaluation unit 212 is adapted to provide a continuous function between a first value enabling no oscillation damping and a second value enabling full oscillation damping The inputs of the requirement evaluation unit 212 comprise at least one of current oscillations and their amplitude from an oscillation member 2121, an estimate of loads incurred in the turbine structure from a load estimate member 2122, an estimate how much damping in the near future might become necessary from an oscillation prediction member 2123, an evaluation concerning a relation of the current wind speed and a rated wind speed from a wind measurement member 2124, and an indication whether and/or how strong an oscillation damping algorithm that is different from an individual blade pitch control is currently performing from an alternative oscillation damping module 2125.

The oscillation member 2121, the load estimate member 2122, the oscillation prediction member 2123, the wind measurement member 2124 and the alternative oscillation damping module 2125 process information similarly to the corresponding members described above. In some embodiments the requirement evaluation unit 212 and at least one of the members are adapted to communicate three or more distinct values from the at least one of the members, the three or more distinct values indicating three or more different intensities of the corresponding parameter.

Since at least one of the parameters is indicated with at least three distinct values, some embodiments allow statements concerning a combination of the parameters that indicate in how far individual blade pitch controlled oscillation damping shall take place. For example, if the oscillation member 2121 indicates a certain requirement to damp and the load estimate member 2122 indicates that oscillation damping will not incur to large loads at the moment, but the oscillation prediction member 2123 indicates that oscillations will decrease anyway some time soon due to a wind field around the wind turbine, the requirement evaluation unit 212 outputs a reduced requirement or even no requirement to damp oscillations at the moment and thereby saves structure lifetime of pitch bearings.

The requirement evaluation unit 212 processes the values. In some embodiments the requirement evaluation unit 212 combines the respective values with weighing factors to unify the values and to allow putting the values into a relationship with each other. This is because the parameters indicate dissimilar conditions such as wind speed, oscillation and structural load, that otherwise cannot easily be combined or compared, if a meaningful statement is required. In such embodiments, once the respective values are unified, they are, in further embodiments, simply summed up or input into a function or a control logic for processing. In the embodiments the output of the requirement evaluation unit 212 indicates a graded requirement to provide individual blade pitch controlled oscillation damping. In further embodiments the requirement evaluation unit 212 only indicates whether individual blade pitch controlled oscillation damping is required or not.

The force estimate evaluation unit 214 receives the operating point as an input 214*i* and provides an indication of an evaluation of an estimated force magnitude counteracting oscillations as an output. The functioning of the force estimate evaluation unit 214 will be explained by reference to FIG. 4 further below. In some embodiments, the output of the force estimate evaluation unit 214 is adapted to provide at least three distinct values indicating a magnitude of force that can be generated by individual blade pitch. For example, the at least three distinct values indicating a magnitude of force refer to a first value indicating that no force can be generated, a second value indicating that some of the required force can be generated and a third value indicating that all required force can be generated.

The outputs of the requirement evaluation unit 212 and the force estimate evaluation unit 214 are input to a lookup table 216. The lookup table 216 provides an output 210*o* of the activation decision unit 210*b* as a function of each pair of the evaluated requirement to provide individual blade pitch controlled oscillation damping and the indication of an evaluation of the estimated force magnitude. In various embodiments, the output of the activation decision unit 210*b* is adapted to provide at least two distinct values, a first value enabling no oscillation damping and a second value enabling full oscillation damping. In further embodiments, the output of the activation decision unit 210*b* is adapted to provide at least three distinct values, wherein a first value enables no oscillation damping, a second value enables some but not full oscillation damping, and a third value enables full oscillation damping. Further distinct values provide additional gradings of oscillation damping. The lookup table 216 may be either static over time or may be adapted by an operator or by a learning algorithm or any other function taking into consideration a change of the wind turbine over time or a finding of better control parameters.

FIG. 4 shows an embodiment of the force estimate unit 213 and the force estimate evaluation unit 214. In a first embodiment corresponding to the force estimate evaluation unit 214 of FIG. 3B, a lookup table 218 is provided having a first input member 2181 and a second input member 2182. First and second input members 2181, 2182 provide a pair of values, which pair defines an operating point of the wind turbine. In further embodiments, one, three or more input members are provided to define the operating point. In further embodiments additional signals defining the operation of the wind turbine are considered.

In some embodiments, the operating point is defined by a pair of signals from the group comprising wind speed, collective pitch reference $\vartheta_0$, produced power, rated power, generated torque and generator speed. From this pair of signals a force generated from an individual pitch adjustment can be calculated offline and may be written to the lookup table 218. The lookup table 218 outputs an indication of how much sideways force can be generated from an individual pitch adjustment. In an embodiment corresponding to the force estimate unit 213, the lookup table 218 simply outputs logic "one" indicating that a sufficient force can be generated, or logic "zero" indicating that a sufficient force cannot be generated. In other embodiments corresponding to the force estimate evaluation unit 214, the lookup table 218 is adapted to output three or more different values depending on how much force can be generated.

In an embodiment, in conditions above a rated power, i.e. a nominal power the wind turbine is designed for, the force estimate unit 213 receives the collective pitch reference $\vartheta_0$ as it is provided to the blade pitch control unit 205. The force estimate unit 213 further compares the collective pitch reference $\vartheta_0$ to the optimum pitch curve. If a difference between the collective pitch reference $\vartheta_0$ and the optimum pitch curve is greater than a predetermined parameter, the force estimate unit approximates that adjusting individually the pitch angle of each rotor blade can generate sufficient force. This is because in this embodiment the optimum pitch curve is generated to deliver a maximum power for conditions below and up to the rated power at rated wind speeds, i.e. nominal wind speeds the wind turbine is designed for, while the collective pitch reference is adapted to a current wind speed, particularly above rated wind speeds. Above rated wind speed, the collective pitch reference is adjusted to deliver a constant power output corresponding to the rated power, even if the wind speed allows a much higher power output. In such conditions the collective pitch reference $\vartheta_0$ provides a better sensitivity from additional individual blade pitching without affecting the power output. Therefore, the collective pitch reference is different from the optimum pitch curve particularly above rated wind speeds. In this embodiment the lookup table has a particularly simple structure as only pitch angles are compared and no further adaption of parameters for a meaningful evaluation is required.

In the depicted embodiment, a switch 219 is arranged at the output of the lookup table 218. The embodiment particularly corresponds to the force estimate unit 213 and provides a logic "one" or a logic "zero" as an output 213*o* of the force estimate unit 213, if enough force can be generated or not, respectively. In further embodiments the switch 219 is adapted to output three distinct values to indicate a grading of the force estimate. In one embodiment, the switch 219 also provides a hysteresis to avoid that the output 213*o* switches between logic "zero" and logic "one" with an unfavorable frequency.

In one embodiment, the pair of signals comprises a produced power and the collective pitch reference $\vartheta_0$. The power reference is provided at the output of a partial load controller. The partial load controller usually controls the rotational speed of the turbine by selecting the proper counter torque so that the efficiency of the turbine is maximised, particularly in wind conditions below rated wind speed, that is in partial load conditions. In some embodiments, the outputs are low pass filtered. Particularly, a low pass filtering of the outputs may be used to avoid a high frequency of output changes of the lookup table or the switch 219.

Figure 5:
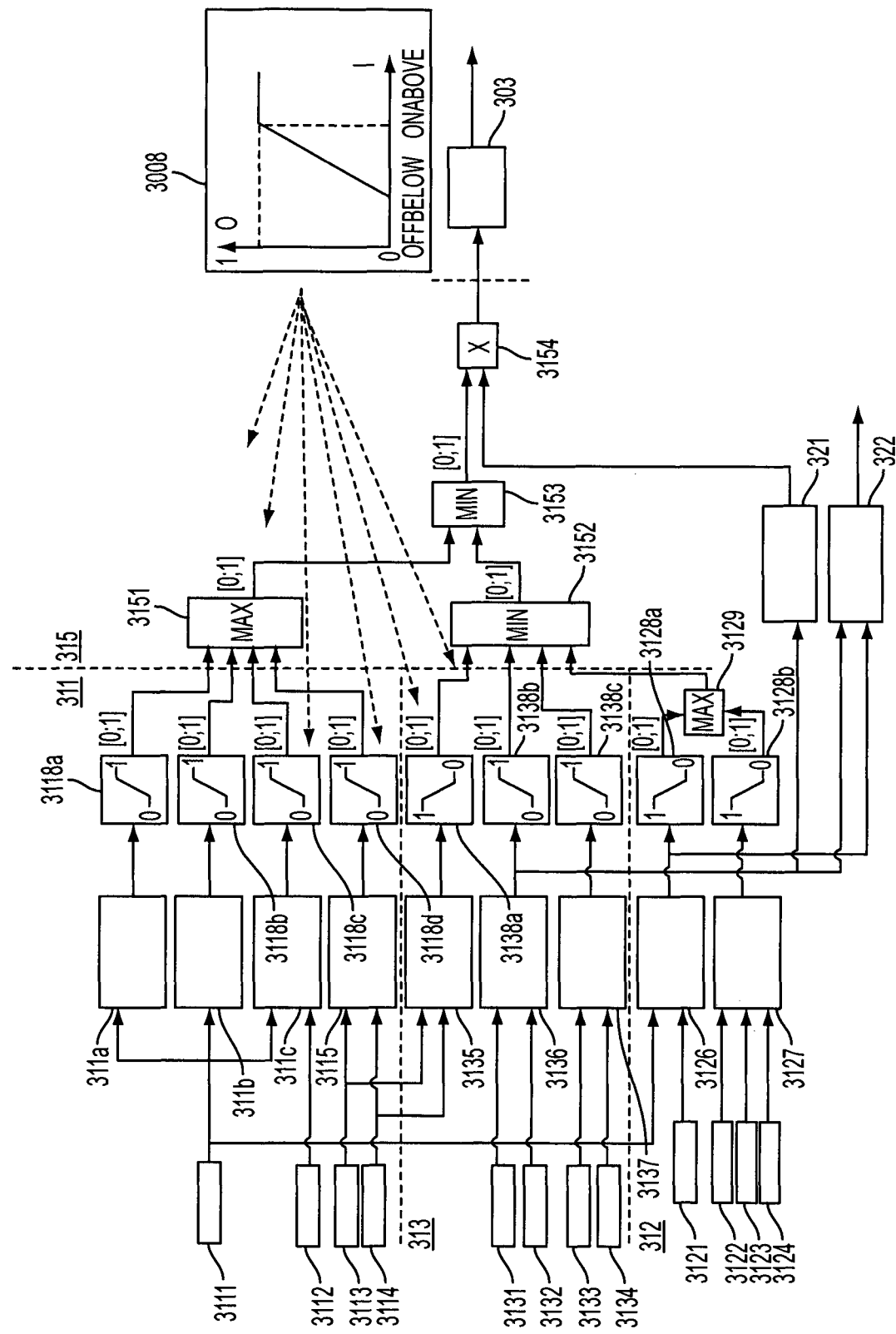
FIG. 5 illustrates a further flow chart of subblocks of the control system according to FIG. 2.

FIG. 5 shows a further embodiment of the activation decision module 202 in more detail. In the embodiment the activation decision unit 210 comprises a requirement value conditioning member 311 and a feasibility value conditioning member 313. For illustration purposes, the members and further structures in FIG. 5 are delimited from each other by dotted lines.

The requirement value conditioning member 311 comprises at least one acceleration processing unit and a power loss evaluation member 3115. The requirement value conditioning member 311 receives as its input a tower acceleration value from a tower acceleration measurement member 3111, a value indicating an estimated damage of the wind turbine 102 from a damage indicator 3112, a rated power reference from a rated power reference member 3113, and an active power reference from an active power reference member 3114.

The tower acceleration is input to the acceleration processing unit comprising an acceleration filter 311a, an acceleration root mean square member 311b and/or a damage estimator 311c. In some embodiments the tower acceleration is processed by only one of the acceleration filter 311a, the acceleration root mean square member 311b and the damage estimator 311c. In further embodiments two or more of the acceleration processing units 311a, 311b, 311c are combined for processing the tower acceleration.

The acceleration filter 311a applies filtering on the tower acceleration to output a preferred portion of the tower acceleration signal. In some embodiments the acceleration filter 311a is a low pass filter outputting tower acceleration signal portions close to and below a first tower eigenfrequency signal. In further embodiments the acceleration filter 311a is a low pass filter outputting tower acceleration signal portions close to and below a rated rotational frequency of the rotor. In further embodiments the acceleration filter 311a is a band pass filter outputting tower acceleration signal portions close to the first tower eigenfrequency or the rated rotational frequency of the rotor. In further embodiments higher harmonics portions of the tower acceleration signal are output.

The acceleration root mean square member 311b calculates and outputs a root mean square signal of the tower acceleration signal to amplify larger signal amplitudes, to suppress signal noise of the tower acceleration signal and to output a signal of low variance over time for the periodically changing tower acceleration signal.

The damage estimator 311c receives the tower acceleration as well as the value indicating an estimated damage from the damage indicator 3112. The damage indicator 3112 receives various load parameters from components of the wind turbine 102 and, in some embodiments, takes into account the mechanical properties of the components. Particularly, the load parameters include previous load cycles and/or magnitudes. The damage estimator 311c uses the information to evaluate the wear of the components under current accelerations. In some embodiments the wear evaluation is based on a history of the components, including lifetime usage such as described in WO 2013/044925, which is incorporated by reference herein, to indicate a component fatigue.

The rated power reference and the active power reference are input to the power loss evaluation member 3115. The rated power reference indicates a maximum power the turbine can output i.e. at which power the turbine limits aerodynamic efficiency by pitching out. Under normal conditions the rated power reference is the same as a name plate of the generator. However, either the turbine itself or an external source can de-rate the turbine i.e. can reduce the maximum power output. The active power reference indicates the power output from the generator of the wind turbine 102. The active power reference is in partial load less than the rated power reference. At rated wind speed and above the active power reference is limited upwards by the rated power reference. The power loss evaluation member 3115 estimates a power loss due to adjusting the rotational speed such that a rotational frequency is different from the eigenfrequency of the tower 102.

Each of the outputs of the acceleration filter 311a, the acceleration root mean square member 311b, the damage estimator 311c and the power loss evaluation member 3115 is provided to respective first, second, third and forth gliding activation functions 3118a, 3118b, 3118c, 3118d also comprised in the requirement value conditioning member 311.

The processing of the respective input is illustrated in a gliding activation function diagram 3008. The gliding activation function 3008 receives the input, for example, a filtered tower acceleration. The input is compared to values OffBelow and OnAbove, where OffBelow is smaller than OnAbove. If the input is smaller than OffBelow, the gliding activation function 3118a outputs "zero". If the input is larger than OffBelow, but smaller than OnAbove, the gliding activation function 3118a outputs a value larger than "zero" but smaller than "one". In an embodiment the output is calculated in this case according to output=input/(OnAbove−OffBelow).

In further embodiments other interpolating functions including non-linear functions are applied. If the input is larger than OnAbove, the gliding activation function 3118a outputs "one". The values for OffBelow and OnAbove for each gliding activation function are independent from each other.

The outputs of the respective gliding activation function 3118a, 3118b, 3118c, 3118d are provided to a first maximum selector 3151 of a combining unit 315. The first maximum selector 3151 compares the output values of the gliding activation functions 3118a, 3118b, 3118c, 3118d with each other and provides the largest output value among them at the output of the first maximum selector 3151. The output of the first maximum selector 3151 represents a need to damp tower oscillations in a range between and including "zero" and "one".

In various embodiments the feasibility value conditioning member 313 comprises a torque damping estimator 3135, a pitch damping estimator 3136 and a wind speed filter 3137. In further embodiments, the feasibility value conditioning member 313 receives as an input the rated power reference from the rated power reference member 3113, and the active power reference from the active power reference member 3114. In further embodiments, the feasibility value conditioning member 313 receives an optimal pitch angle according to the optimum pitch curve from an optimum pitch curve unit 3131, a reference pitch angle from a reference pitch member 3132, a measured wind speed from a wind measurement member 3133 and an estimated wind speed from a wind estimate member 3134. In further embodiments the feasibility value conditioning member 313 comprises a first flipped gliding activation function 3138a, and fifth and sixth gliding activation functions 3138b, 3138c.

In various embodiments, the rated power reference and the active power reference are input to the torque damping estimator 3135. The torque damping estimator 3135 estimates a damping capability of tower vibrations from a variation of the torque of the generator, for example in the form of a generator torque induced force sensitivity (dF/dP). The torque of the generator is adjusted by adjustment of a power output from the generator and thereby accelerating or decelerating the rotor. By accelerating or decelerating the rotor a sideways force on the tower is varied selectively, allowing counteraction of sideways tower vibrations. The torque damping estimator 3135 compares the rated power reference and the active power reference from the generator and determines a range in which the power output can be varied. From this range, the torque damping estimator 3135 estimates the resulting damping capability by means of this method and provides the resulting estimate to the first flipped gliding activation function 3138a. The first flipped gliding activation function 3138a outputs "one" for input values below a lower threshold, and outputs "zero" for input values above an upper threshold. For values there between, the first flipped gliding activation function 3138a calculates an output according to a linear or non-linear interpolating function.

In embodiments according to the depicted embodiment, the pitch damping estimator 3136 receives the optimal pitch angle and the reference pitch angle as an input. From the input the pitch damping estimator 3136 deduces a capability to damp tower vibrations by means of pitch adjustment, for example in the form of pitch force sensitivity (dF/dθ). It has been found that a pitch force sensitivity is particularly low, when a reference pitch angle is close to an optimal pitch angle.

When the reference pitch angle is different from the optimal pitch angle, the pitch force sensitivity is higher. Sometimes this is due to a pitch force sensitivity being significant in wind conditions above rated wind speed and less significant in conditions below rated wind speed. The optimal pitch angle is evaluated and applied for wind conditions below rated wind speed to deliver as much power as possible for a given wind speed. The reference pitch angle above rated wind speed delivers a constant power output even in wind variations. Hence, when the reference pitch angle corresponds to the optimal pitch angle, in fact, the wind conditions are below rated and the pitch force sensitivity is low.

Hence, the pitch damping estimator 3136 estimates a damping capability by comparing the optimal pitch angle and the reference pitch angle, and provides the resulting estimate to the fifth gliding activation function 3138b and to further functions as explained below.

In further embodiments the sensitivity functions in the form of a generator torque induced force sensitivity and in the form of pitch force sensitivity are estimated by the turbine itself by using an operating point. Similar to the operating point discussed further above the operating point is defined by a value from the group of measured wind speed, estimated wind speed, active power reference, rated power, rotor speed, rotor position, yaw error (measured or estimated), generator torque and generator speed, or a combination of two or more of the values from this group. In some embodiments such estimate is based on data collected before operation of the wind turbine.

In further embodiments the measured wind speed and the estimated wind speed are input to the wind speed filter 3137. The wind speed filter 3137 combines the input, for example by calculating a mean value, and filters their combination, for example in a low pass filter.

The wind speed filter 3137 provides the resulting output to the sixth gliding activation function 3138c.

Each of the fifth and sixth gliding activation functions 3138b, 3138c processes the input as explained above with respect to the gliding activation function diagram 3008. The output of each gliding activation function 3138b, 3138c and of the first flipped gliding activation function 3138a is provided to a first minimum selector 3152 of the combining unit 315. The first minimum selector 3152 compares the output values of the gliding activation functions 3138b, 3138c and of the first flipped gliding activation function 3138a with each other and provides the smallest output value among them at the output of the minimum selector 3152. The output of the first minimum selector 3152 represents a feasibility to damp tower oscillations in a range between and including "zero" and "one".

In some embodiments, the feasibility to damp can be based on a detection of a rotor icing condition. Such a condition could decrease the ability of the turbine to create lateral force with individual pitch to counteract lateral tower oscillations.

The outputs from the first maximum selector 3151 and the first minimum selector 3152 are combined in a second minimum selector 3153. The second minimum selector 3153 provides the smaller output between the need to damp and the feasibility to damp. The output of the second minimum selector 3153 represents an activation level in a range between and including "zero" and "one".

In some embodiments the activation level is input to a multiplier 3154. The multiplier 3154 receives a gain schedule from a controller gain scheduler 321. The multiplier 3154 multiplies the activation level with the gain schedule and outputs an activation gain. The controller gain scheduler 321 provides the gain schedule as a function of the pitch force sensitivity calculated in the pitch damping estimator 3136 in order to normalize the output of the multiplier 3154 across all wind speeds. Thus, even though the pitch force sensitivity varies across a range of wind speeds, the activation gain does not vary with the wind speed.

In some embodiments the activation gain value is provided to a rate limiter 303. The rate limiter 303 outputs a control gain corresponding to the output 202o of the activation decision unit 202. The rate limiter 303 corresponds to the smoothing unit 203 and prevents sudden changes to a control gain. In embodiments including the gain scheduler, a prediction of tower oscillations is of lower importance.

In some embodiments the activation decision module 202 additionally comprises a structure safety member 312. The structure safety member 312 comprises in various embodiments an acceleration comparator 3126 and/or a wear estimator 3127. The structure safety member 312 receives as an input the tower acceleration from the tower acceleration measurement member 3111, an acceleration alarm limit from an alarm limit member 3121, a blade load such as a flapwise blade load from a blade load member 3122, a pitch position, a pitch speed and a pitch acceleration from a pitch state member 3123 and a thrust force from a thrust force member 3124. In further embodiments, the structure safety member 312 comprises second and third flipped gliding activation functions 3128a, 3128b.

The acceleration comparator 3126 receives the tower acceleration and the acceleration alarm limit as an input. From the input the acceleration comparator 3126 calculates an acceleration alarm distance signal from the distance of the tower acceleration to the alarm limit as an output. In some embodiments the distance signal is filtered before being output, e.g. in a low pass filter or a band pass filter. The distance signal is provided to the second flipped gliding activation function 3128a. The second flipped gliding activation function 3128a will particularly output a logic "one", if the acceleration alarm distance is too small, and a logic "zero" if the acceleration alarm distance is large enough.

The wear estimator 3127 receives in various embodiments the blade load, the pitch position, the pitch speed, the pitch acceleration, and/or the thrust force as an input. The wear estimator 3127 estimates from the input an actuator wear experienced by pitch actuators adjusting the pitch angles of the rotor blades 110 due to current and/or impending pitch adjustment. In various embodiments the determined actuator wear takes former, current and/or impending actuator wear into account. The wear estimator 3127 provides the actuator wear signal to the third flipped activation function 3128b. The third flipped activation function 3128b will particularly output a logic "one", if the estimated actuator wear is small, and a logic "zero" if the estimated actuator wear is large enough.

The second and third flipped gliding activation functions 3128a, 3128b processes the input as explained above with respect to the first flipped gliding activation function 3138a. The output values of the second and third flipped gliding activation functions 3128a, 3128b are provided to a second maximum selector 3129. The second maximum selector 3129 compares the output values of the second and third flipped gliding activation functions 3128a, 3128b with each other and provides the largest output value as a structure safety signal.

The structure safety signal is provided to the first minimum selector 3152 of the combining unit 315. The first minimum selector 3152 includes the structure safety signal in its comparison of output values from the feasibility value conditioning member 313.

The structure safety member 312 actually indicates that damping is desired and, thus, could in other embodiments be a part of the requirement value conditioning member 311. However, by combining the structure safety signal in the first minimum selector 3152 with the output values from the feasibility value conditioning member 313, an indication of the feasibility to damp will be augmented, if the structure safety member 312 indicates a raised requirement and potentially increases a damping enablement. This way, even if a pitch force sensitivity is too low to effectively attenuate the tower oscillations, the tower acceleration is pushed away from the alarm limit and an operation of the wind turbine can be maintained.

As stated above, the pitch force sensitivity is particularly low if the reference pitch angle is close to the optimal pitch angle. Therefore, in some embodiments the estimated capability to damp by means of pitch adjustment as determined in the pitch damping estimator 3136 and/or the acceleration alarm distance signal are provided to a damping capability expander 322. The damping capability expander 322 determines whether an additional capability to damp by means of pitch adjustment is required, for example based on the acceleration alarm distance signal. To generate the additional capability, the damping capability expander 322 instructs the blade pitch control unit 205 to add a collective offset pitch angle to the collective pitch references $\vartheta_0$, such that a distance of the reference pitch angles to the optimal pitch angles and thereby the pitch force sensitivity are increased. Thus, it is possible to improve the capability to damp by means of pitch force adjustment.

However, this additional capability to damp is traded for a more optimal operation of the wind turbine and in many cases for an amount of power that is not generated.

The skilled person understands that a logic "one" and a logic "zero" as used above can likewise be output in the opposite cases depending on a definition and a convention as used in a corresponding module.

It should be noted that, e.g. for statistical reasons, the method can comprise estimating what the tower oscillation would have been if the damping would not have been selected.

REFERENCE SIGNS 102 wind turbine
104 nacelle
106 rotor hub
108 wind turbine tower
110 rotor blades
200 damping control logic
201 sideways damping controller
2010 offset pitch angle
202 activation decision module
202o output of the activation decision module
203 smoothing unit
204 multipliers
204o output of the multipliers
205 blade pitch control unit
206 pitch curve unit
207 low level pitch controller
208 blade pitch drive
210, 210a, 210b activation decision unit
210i input of the activation decision unit
210o output of the activation decision unit
211 requirement unit
2110 output of the requirement unit
212 requirement evaluation unit
213 force estimate unit
213i input of the force estimate unit
213o output of the force estimate unit
214 force estimate evaluation unit
214i input of the force estimate evaluation unit
215 multiplier
216 lookup table
218 lookup table
219 switch
2111 oscillation threshold member
2112 load estimate member
2113 oscillation prediction member
2114 wind measurement member
2115 alternative oscillation damping module
2121 oscillation member
2122 load estimate member
2123 oscillation prediction member
2124 wind measurement member
2125 alternative oscillation damping module
2181 first input member
2182 second input member
303 rate limiter
3008 gliding activation function diagram
311 requirement value conditioning member
311a acceleration filter
311b acceleration root mean square member
311c damage estimator
3111 tower acceleration measurement member
3112 damage observer
3113 rated power reference member
3114 active power reference member
3115 power loss evaluation member
3118a gliding activation function
3118b gliding activation function
3118c gliding activation function
3118d gliding activation function
312 structure safety member
3121 alarm limit member
3122 blade load member
3123 pitch state member
3124 thrust force member
3126 acceleration comparator
3127 wear estimator
3128a gliding activation function
3128b gliding activation function
3129 second maximum selector
313 feasibility value conditioning member
3131 optimum pitch curve unit
3132 reference pitch member 3133 wind measurement member
3134 wind estimate member
3135 torque damping estimator
3136 pitch damping estimator
3137 wind speed filter
3138a flipped gliding activation function
3138b gliding activation function
3138c gliding activation function
315 combining unit
3151 first maximum selector
3152 first minimum selector
3153 second minimum selector
3154 multiplier
321 controller gain scheduler
322 damping capability expander

What is claimed is:

1. A method for operating a wind turbine, the wind turbine comprising a tower and a rotor with at least one rotor blade, the rotor being connected to the tower and being configured to drive a generator, wherein a pitch angle of each rotor blade is adjustable, the method comprising:
   detecting an oscillation of the tower, and
   selectively damping the oscillation of the tower, wherein selectively damping the oscillation comprises:
      determining a requirement to damp the oscillation,
      determining a resulting damping effect that will result when an active damping system of the wind turbine is enabled;
      determining, using the resulting damping effect, a feasibility of damping the oscillation by the active damping system, and
      selectively enabling the active damping system based on the feasibility of damping the oscillation by the active damping system.

2. The method according to claim 1, wherein determining the requirement to damp the oscillation is based on at least one of:
   determining that the oscillation of the tower reaches an oscillation threshold,
   an indication whether a different oscillation damping control algorithm is operating,
   an indication whether a passive tower damper is operating,
   determining a load in the wind turbine that will result when the active damping system is enabled, and
   a relation between a current wind speed and a rated wind speed, and
   a predicted lateral oscillation of the tower.

3. The method according to claim 1, wherein determining the resulting damping effect is based on at least one of:
   a resulting sideways force that can be generated by individually adjusting the pitch angle;
   a difference between the pitch angles of the rotor blades and optimal pitch angles;
   a pitch force sensitivity (dF/dS);
   a relation between a current power and a rated power;
   a relation between a current wind speed and a rated wind speed,
   a resulting sideways force that can be generated by a generator torque-induced force adjustment, and
   an operating point of the wind turbine.

4. The method according to claim 1, wherein selectively enabling the active damping system comprises:
   generating, based on a combination of the requirement to damp and the resulting damping effect, a value grading the enablement of the active damping system, wherein the value is provided as one of at least three distinct values:
      a first value enabling no oscillation damping;
      a second value enabling full oscillation damping; and
      a third value enabling a distinct grading of oscillation damping between no oscillation damping and full oscillation damping; and
   selectively enabling the active damping system according to the value grading the enablement.

5. The method according to claim 1, wherein the oscillation of the tower is a lateral oscillation.

6. The method according to claim 5, wherein damping the lateral oscillation comprises damping using a smoothed individual pitch angle adjustment.

7. The method according to claim 6, wherein damping using the smoothed individual pitch angle adjustment reduces a control action of a different lateral oscillation damping control algorithm.

8. The method according to claim 2, wherein determining the load in the wind turbine that will result when the active damping system is enabled comprises:
   determining at least one of a main bearing tilt moment and a rate of accumulation of blade bearing fatigue.

9. The method according to claim 1, wherein detecting the oscillation of the tower comprises predicting the oscillation using at least one of:
   measuring an edgewise moment and deriving the edgewise moment over time to receive an indication of a development of the edgewise moment; and
   measuring a wind field in an area around the wind turbine.

10. The method according to claim 2, wherein the different oscillation damping control algorithm adjusts a rotational speed of the rotor such that rotor-induced oscillations have a frequency different from a natural frequency of the tower.

11. The method according to claim 3, further comprising:
   calculating, before operating the wind turbine, a damping effect that can be generated from a particular individual blade pitch adjustment at a particular operating point, and
   storing the damping effect in a lookup table.

12. The method according to claim 5, further comprising:
   providing an optimal pitch angle for each rotor blade,
   adjusting a current pitch angle of each rotor blade as a function of one or more of the optimal pitch angle, a wind condition, and an output requirement of the generator,
   determining a capability to damp the lateral oscillation by means of pitch adjustment, wherein determining the capability to damp comprises evaluating a difference between the optimal pitch angle for each rotor blade and the current pitch angle of each rotor blade,
   determining whether an additional capability to damp by means of pitch adjustment is required, and
   increasing, when the additional capability to damp is required, the difference between the optimal pitch angle and the current pitch angle.

13. The method according to claim 1, wherein selectively enabling the active damping system based on the resulting damping effect relative to the requirement comprises:
   determining a tower acceleration and an acceleration alarm limit, and
   determining an acceleration alarm distance signal from a distance of the tower acceleration to the acceleration alarm limit.

14. The method according to claim 5, wherein damping the lateral oscillation comprises damping using a generator torque-induced force adjustment.

15. The method according to claim 14, wherein damping using the generator torque-induced force adjustment comprises:
varying a counter torque of the generator over time in dependence on a cyclic pattern of the lateral oscillation to provide a generator torque-induced force that reduces the lateral oscillation.

16. The method according to claim 1, further comprising:
storing, accessible to a controller of the wind turbine, control data for a plurality of tower oscillation damping actions, and
damping the oscillation of the tower with a selected at least one of the plurality of tower oscillation damping actions.

17. The method according to claim 16, wherein the plurality of tower oscillation damping actions comprise damping by means of blade pitch angle adjustment.

18. The method according to claim 17,
wherein the oscillation of the tower is a lateral oscillation, and
wherein the blade pitch angle adjustment generates sideways forces that counteract the lateral oscillation.

19. The method according to claim 16,
wherein the oscillation of the tower is a lateral oscillation, and
wherein the plurality of tower oscillation damping actions comprise adjusting a rotational speed of the rotor such that rotor-induced oscillations have a frequency different from a natural frequency of the tower.

20. The method according to claim 16,
wherein the oscillation of the tower is a lateral oscillation, and
wherein the plurality of tower oscillation damping actions comprise generator torque-induced force adjustment.

21. The method according to claim 16, further comprising:
selecting the selected at least one of the plurality of tower oscillation damping actions based on the requirement to damp and on the resulting damping effect.

22. A wind turbine comprising:
a tower;
a generator;
a rotor with at least one rotor blade, the rotor being connected to the tower and configured to drive the generator, wherein a pitch angle of each rotor blade is adjustable; and
a control system comprising:
a detecting member configured to detect an oscillation of the tower;
a requirement member configured to determine a requirement to damp the oscillation;
a damping effect member configured to determine a resulting damping effect that will result when damping the oscillation is enabled, wherein the resulting damping effect indicates a feasibility of damping the oscillation by an active damping system;
a damping member configured to damp the oscillation of the tower via active damping; and
an enablement member configured to selectively enable the damping member based on the feasibility of damping the oscillation by the active damping system.

* * * * *

UNITED STATES PATENT AND TRADEMARK OFFICE
CERTIFICATE OF CORRECTION

PATENT NO. : 10,619,623 B2
APPLICATION NO. : 15/102955
DATED : April 14, 2020
INVENTOR(S) : Fabio Caponetti et al.

Page 1 of 1

It is certified that error appears in the above-identified patent and that said Letters Patent is hereby corrected as shown below:

On the Title Page

In item (73), in Column 1, in "Assignee", Line 1, delete "VERSTAS" and insert -- VESTAS --, therefor.

In item (56), in Column 2, under "Other Publications", Line 1, delete "201480075088,1" and insert -- 201480075088.1 --, therefor.

Signed and Sealed this
Sixteenth Day of June, 2020

Andrei Iancu
*Director of the United States Patent and Trademark Office*